(12) United States Patent   (10) Patent No.: US 8,021,097 B2
McVaugh                      (45) Date of Patent:    Sep. 20, 2011

(54) LOADING AND UNLOADING REEL CARRIER TRUCK

(75) Inventor: Arthur K. McVaugh, Green Lane, PA (US)

(73) Assignee: Dejana Truck & Utility Equipment Co., Kings Park, NY (US)

(*) Notice: Subject to any disclaimer, the term of this patent is extended or adjusted under 35 U.S.C. 154(b) by 276 days.

(21) Appl. No.: 12/286,440

(22) Filed: Sep. 30, 2008

(65) Prior Publication Data

US 2009/0097951 A1   Apr. 16, 2009

Related U.S. Application Data

(60) Provisional application No. 60/999,042, filed on Oct. 15, 2007.

(51) Int. Cl.
*B60P 1/48* (2006.01)

(52) U.S. Cl. ............ 414/546; 410/49; 242/557

(58) Field of Classification Search .......... 414/546, 414/555, 549; 410/47, 49; 74/469, 470; 242/557
See application file for complete search history.

(56) References Cited

U.S. PATENT DOCUMENTS

| 3,184,082 A | 5/1965 | Hall |
| 3,325,118 A | 6/1967 | Hall |
| 3,820,673 A | 6/1974 | McVaugh |
| 4,228,967 A | 10/1980 | Woodruff |
| 4,591,309 A | 5/1986 | Clapp, Jr. |
| 5,123,602 A | 6/1992 | Skalleberg et al. |
| 5,897,073 A | 4/1999 | McVaugh |
| 6,467,715 B2 * | 10/2002 | Go ................. 242/390.5 |

* cited by examiner

*Primary Examiner* — Gregory Adams
*Assistant Examiner* — Jonathan Snelting
(74) *Attorney, Agent, or Firm* — Kinney & Lange, P.A.

(57) ABSTRACT

A cable reel carrier device, including at least one pair of work arms that engage a spindle bar in the center of a reel of cable and the like, and the work arms lift the reel on to or off of a truck bed. Where two pairs of work arms are used, the first reel is passed forward from the first pair to the second pair. A safety device engages the spindle bar to prevent inadvertent release of the reels.

6 Claims, 5 Drawing Sheets

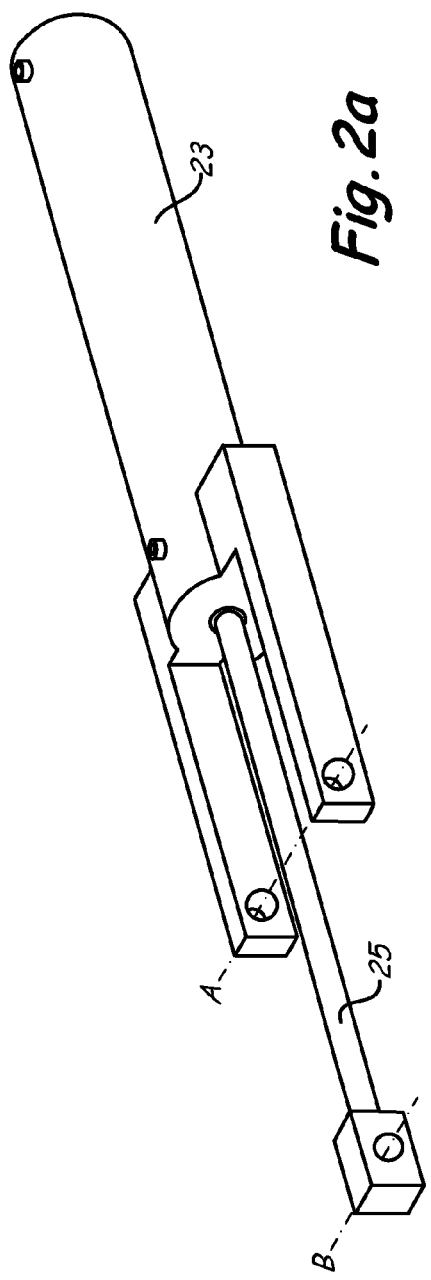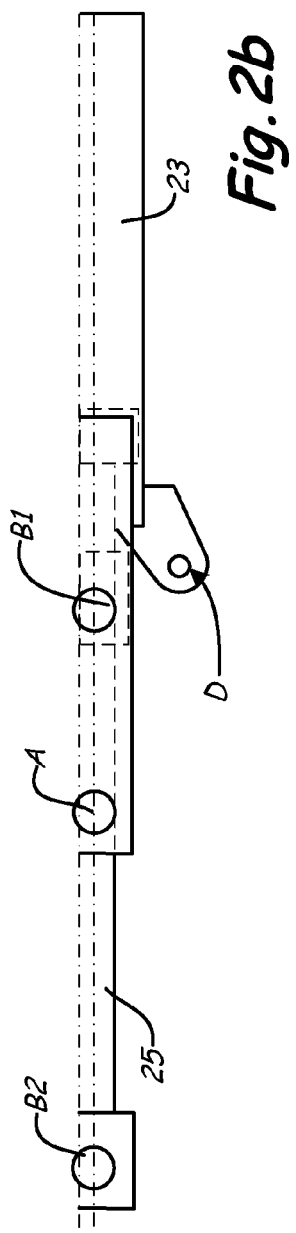

LOADING AND UNLOADING REEL CARRIER TRUCK

CROSS-REFERENCE TO RELATED APPLICATION(S)

This application is based upon Provisional Application titled SELF LOADING REEL\CARRIER TRUCK, having Ser. No. 60/999,042 and filed on Oct. 15, 2007.

BACKGROUND

The present invention relates to a device for loading and unloading cable reels and the like from trucks, trailers or other supported beds. More particularly, the present invention relates to a reel handler device with a primary function of lifting and loading cable reels on to a truck bed or the like.

Reel handlers for loading and unloading reels from trucks or trailers are not new per se. Some reel handlers allow for powered payout and take-up of cable from the loaded reels by the use of friction rollers contacting the periphery of the reels. Examples are Hall, U.S. Pat. Nos. 3,184,082 and 3,325,118; and Woodruff, U.S. Pat. No. 4,228,967. Skalleberg et al U.S. Pat. No. 5,123,602 discloses a drive for cable reels by the use of frictional contact of the reel periphery with a powered car tire as the roller.

McVaugh, U.S. Pat. No. 3,820,673 allows for engagement of reels of varying sizes and permits transfer of one reel to a first location and return for a second reel. The assignee of that patent has a related U.S. Pat. No. 4,591,309. An improvement on this prior art is McVaugh U.S. Pat. No. 5,897,073, which has the advantage of using rugged motors and devices of relatively few moving parts to minimize damage and breakdown of the reel handler during use.

While that latter reel handler uses a compact, high torque, low speed hydraulic motor within its supporting reel arm to rotate the reel, there are some drawbacks to that design. Specifically, the angular travel or swing of the lift arms was less than preferred, and it was not seen to be possible to increasing the swing because of space constraints. In addition, mechanical losses at either end of the cylinder stroke became a concern. This patent uses mechanical "toggle links" between the lift arms and their lift hydraulic cylinders to achieve the angular swing of the lift arms, but they have a built in mechanical disadvantage.

Accordingly, it would be an advantage in the art if a reel loader could be provided with improved angular travel or swing.

Other advantages will appear hereinafter.

SUMMARY

It has now been discovered that the above and other objects of the present invention may be accomplished in the following manner. Specifically, the present invention provides a reel handler.

The reel loader of this invention is mounted on a truck or other vehicle such that it is at the back of the truck. A portion of the truck includes a place for placing one or two reels having cable of assorted sizes and construction that are common in the electric utility and telephone industries. The loader includes a pair of rear reel lifting arms with one on each side. The arms are fixed to one another and function to lift and load reels. The pair of arms each have a forward arm portion that is used to transfer the reel forward or back to allow a second reel to be added or to allow a forward reel to be unloaded. The bed on which the reels rest includes a pair of driving rollers that rim drive the reels rotationally to permit light winding or unwinding.

The reel carrier or loader of this invention includes hydraulic cylinders that are connected together and include lifting posts that control the angular travel of the cylinder as its ram extends and retracts.

Also included in the present invention are safety grabbing means located on the outer ends of all the lifting arms for retaining the spindle bars, which are axel shafts placed through the center of the reels, and which are grabbed as the device lifts the reels.

BRIEF DESCRIPTION OF THE DRAWINGS

FIG. 2a is a perspective view of the hydraulic cylinder of this invention.

FIG. 2b is a side view of the cylinder of FIG. 2a.

DETAILED DESCRIPTION

Figure 1:
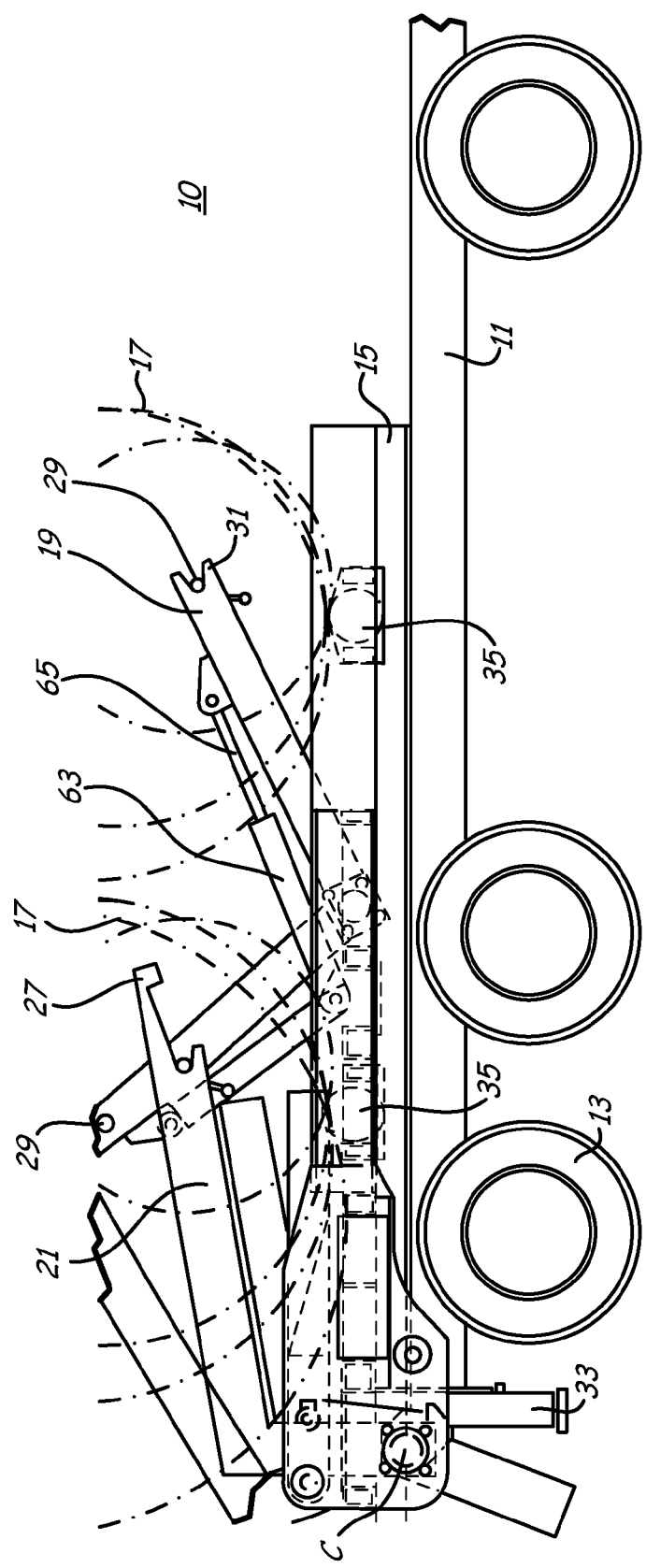
FIG. 1 is a side elevational view of the preferred embodiment of the present invention, shown in two positions.

A reel carrier device, 10 generally, is adapted to be used with a vehicle such as a flat bed truck 11, preferably with tandem axles 13 and a bed 15 as shown in the drawings. The truck 11 is used to transport reels 17 of assorted sizes and construction that are common in the electric utility and telephone industries to carry cable material.

A first work arm pair 19 is forward of the end and a second work arm pair 21 is toward the back of the truck 11, it being understood that the pair engages both ends of reels, as described below. Hydraulic double-acting cylinders 23 and pistons 25, shown separate in FIGS. 2a and 2b, are mounted on the bed 15 and operate to move the pair of work arms 21 through an arc whereby the rear pair of arms 21 pick up a reel 17 from the ground or other place where it is at rest, such as a loading dock, warehouse or the like. Cylinder 63 and piston 65 provide impetus to move a front reel forward.

Figure 3:
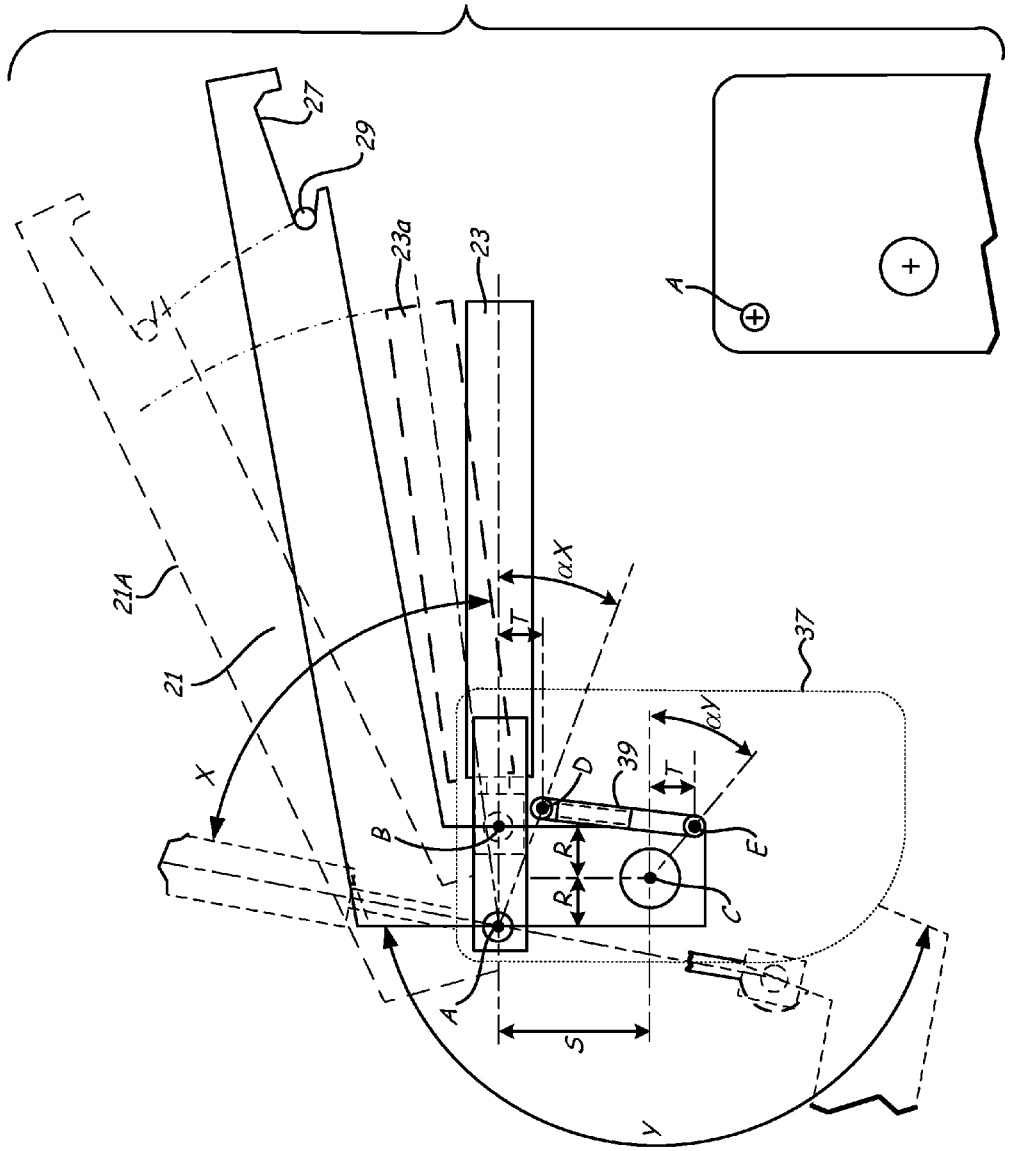
FIG. 3 is a side view illustrating the geometric movement of an arm of the present invention.

As seen in FIGS. 1 and 3, the end of work arm 21 includes a reel engaging end 27 that engages spindle bar 29. Reel engaging end 27 is shown in the position in FIG. 1 where it has deposited a first reel 17, which has been engaged by reel engaging end 31 of the first pair of work arms 19, and moved that first reel to the front of the bed 15. A standard jack stand 33, shown lifted up for travel from pickup to delivery. Driving rolls 35 in truck bed 15 can be powered to drive the reels in a rotation for light winding or unwinding.

Support structure 37 mounts the arms and cylinders. Work arm pair 21 pass through an arc Y of about 160° to an open condition with piston 25 fully extended, shown at the end in FIG. 3 in solid line 21 and in dash lines 21a, when hydraulic cylinder 23 pushes piston 25 out along the axis of piston 25, also lifting cylinder 23 to the position shown in dash lines at 23a for an angle arc X of 80°.

Figure 4:
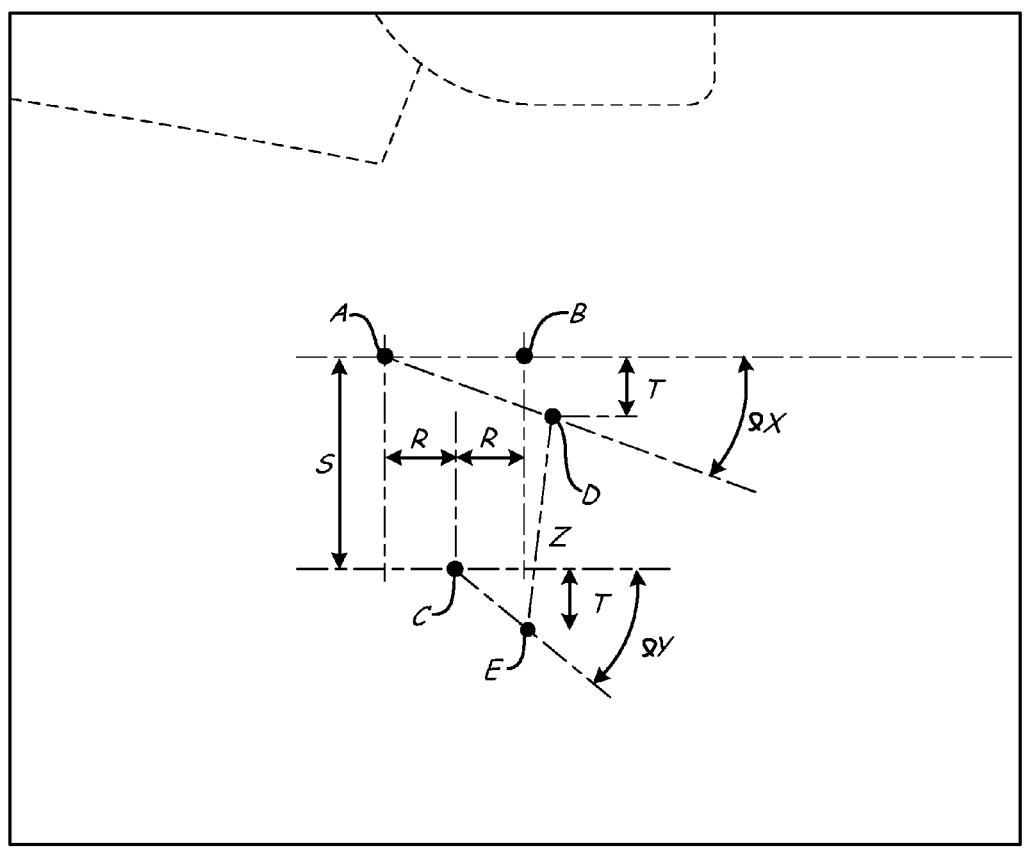
FIG. 4 is a geometric diagram of the device shown in FIG. 3.

In FIG. 3, pivot point A is the cylinder 23 trunion mount, pivot point B is the cylinder ram to work arm location, pivot point C is the work arm 21 mount to the support structure, pin D connects the lift column 39 to cylinder 23, and pin connection E connects the lift column 39 to the work arm 21. Points B, D, and E move about points A and C, where point B moves linearly along the center line of cylinder 23, and the cylinder angular travel up to 80° is always half of work arm travel up to 160°. In FIG. 4, lift arm 39 dimension Z is fixed during the first one half of the machine's angular travel, and then is free to extend, telescopically, for the second half of machine angular travel to the open state, doing no work in this second half. The function of lift arm 39 is to bear the weight of the cylinder 23 and reel in that first half of angular travel.

In FIG. 4, the relative dimensions of the elements in FIG. 3 are shown as a diagram. The lifting column 39 is fixed in hole E of work arm 21 at one end and in hole D on the cylinder 23. Column 39 is shown as having a length z, which is, in one example, 18.6 inches. Line A-D angle αX, which is about 20°, and line C-E through angle αY, which is twice that or 40°. Both line A-D and line C-E have the same distance T, which is 5.3 inches in the example. In FIG. 2a, points A and B are shown with piston 25 extended from cylinder 25, whereas FIG. 2b shows the distance of travel of point B from B1 at cylinder 23 to full extension at B2, In FIG. 4, the distance between point A and point B is twice R or, in the example, about twice six inches. Distance S is, in the example, 18.46 inches, just a bit less than distance Z.

Figure 5A:
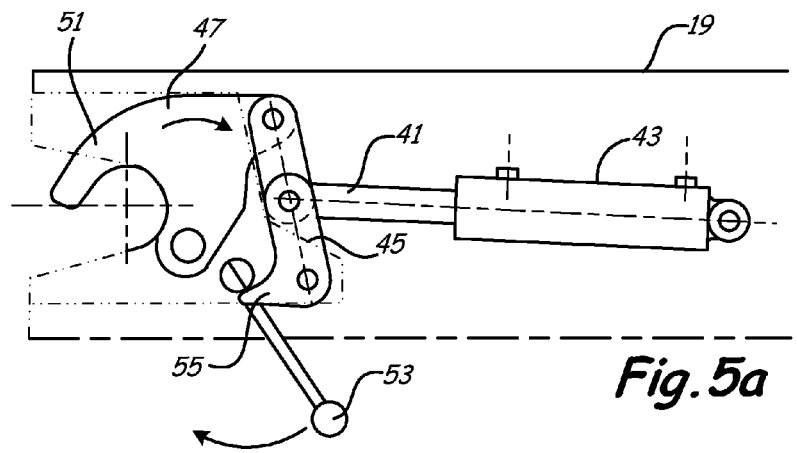
FIGS. 5a and 5b illustrate a grasping device used in the present invention in a shaft engaging position and a shaft disengaging position respectively.
Figure 5B:
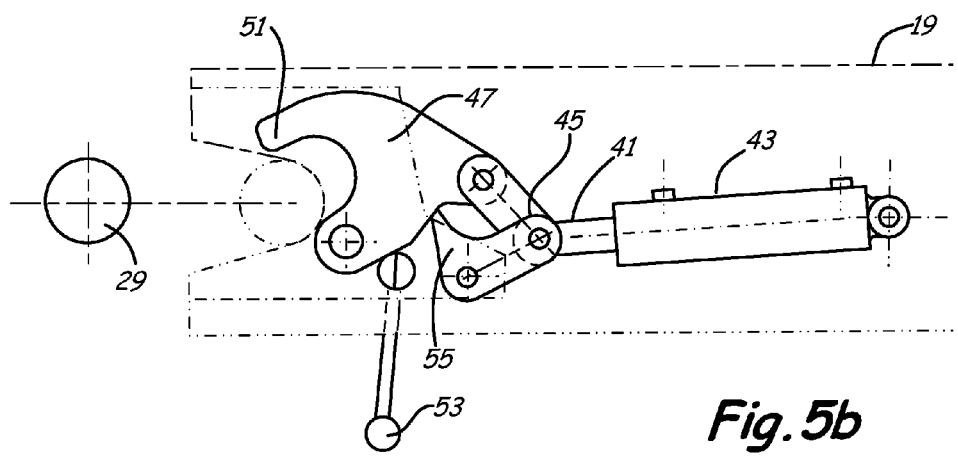

An improved grasping device is shown in open and closed positions in FIGS. 5a and 5b. A piston 41 and cylinder 43 operate to move arm 45 and rotate jaw 47 so that the engaging element 51 of jaw 47 holds spindle bar 29. Lever 53 moves into engagement with lower end 55 of arm 45 to lockjaw 47 on spindle bar 29, in FIG. 5a, so that if hydraulic pressure in cylinder 43 fails, the device will still hold the spindle bar 29 and, thus, a reel on spindle bar 29 will not escape to cause damage.

Although the present invention has been described with reference to preferred embodiments, workers skilled in the art will recognize that changes may be made in form and detail without departing from the spirit and scope of the invention.

The invention claimed is:

1. A cable reel loader device for use with a platform on a vehicle for holding a plurality of reels each having an axial spindle, comprising:
    a base on the vehicle having a resting location for each of the plurality of reels including a first rearward resting location and a second forward resting location;
    a first work arm pair mounted on the base and having a reel spindle engaging end;
    a first double acting hydraulic cylinder pair mounted on the base, the cylinder pair having rams attached directly to the first work arm pair and adapted to move the work arm spindle engaging ends through a first arc between a first position for placing or receiving a reel on the ground and a second position placing the reel at the first rearward resting position on the base;
    a pair of lifting columns connected at one end to the base end of the first work arm pair and connected at the other end to the double acting hydraulic cylinder pair to synchronize arc travel of the hydraulic cylinder pair with arc travel of the work arm pair in a proportional arcing travel ratio of one to two, wherein the lifting columns are telescoping columns adapted to extend as the cylinders move the first work arm pair through the middle of the first arc to engage a reel on the ground;
    a second work arm pair mounted on the base and having a reel spindle engaging end; and
    a second double acting hydraulic cylinder and piston mounted on the base and attached to the second work arm pair, the piston having a spindle engaging end and being positioned to move its spindle engaging end through a second arc between a first position for receiving a reel from the first work arm pair reel spindle engaging end and a second position placing the reel at the second forward resting location on the base.

2. The device of claim 1, wherein the first arc of the spindle is about 160 degrees with respect to the vehicle platform.

3. The device of claim 1, which further includes at least one hydraulic jack to stabilize the vehicle during operation of the device.

4. The device of claim 1, wherein the first and second work arm pairs are mounted so that one of each pairs engages one end of the spindle and the other of each pairs engages the other end of the spindle.

5. The device of claim 1, which further includes driving rolls positioned at the first resting location and second resting location to engage a reel at those locations for rotating the reel.

6. The device of claim 1, wherein the spindle engaging ends of the first and second work arm pairs further include latch means adjustably preventing and permitting removal of the spindle from the spindle engaging ends.

* * * * *

UNITED STATES PATENT AND TRADEMARK OFFICE
CERTIFICATE OF CORRECTION

| | | |
|---|---|---|
| PATENT NO. | : 8,021,097 B2 | Page 1 of 1 |
| APPLICATION NO. | : 12/286440 | |
| DATED | : September 20, 2011 | |
| INVENTOR(S) | : Arthur K. McVaugh | |

It is certified that error appears in the above-identified patent and that said Letters Patent is hereby corrected as shown below:

Col. 3, Line 28
  Delete "lockjaw"
  Insert --lock jaw--

Signed and Sealed this
Eighteenth Day of December, 2012

David J. Kappos
*Director of the United States Patent and Trademark Office*